Aug. 19, 1947.  E. J. BRISBEN  2,425,988
CHUCK TOOL HOLDER
Filed Feb. 14, 1945
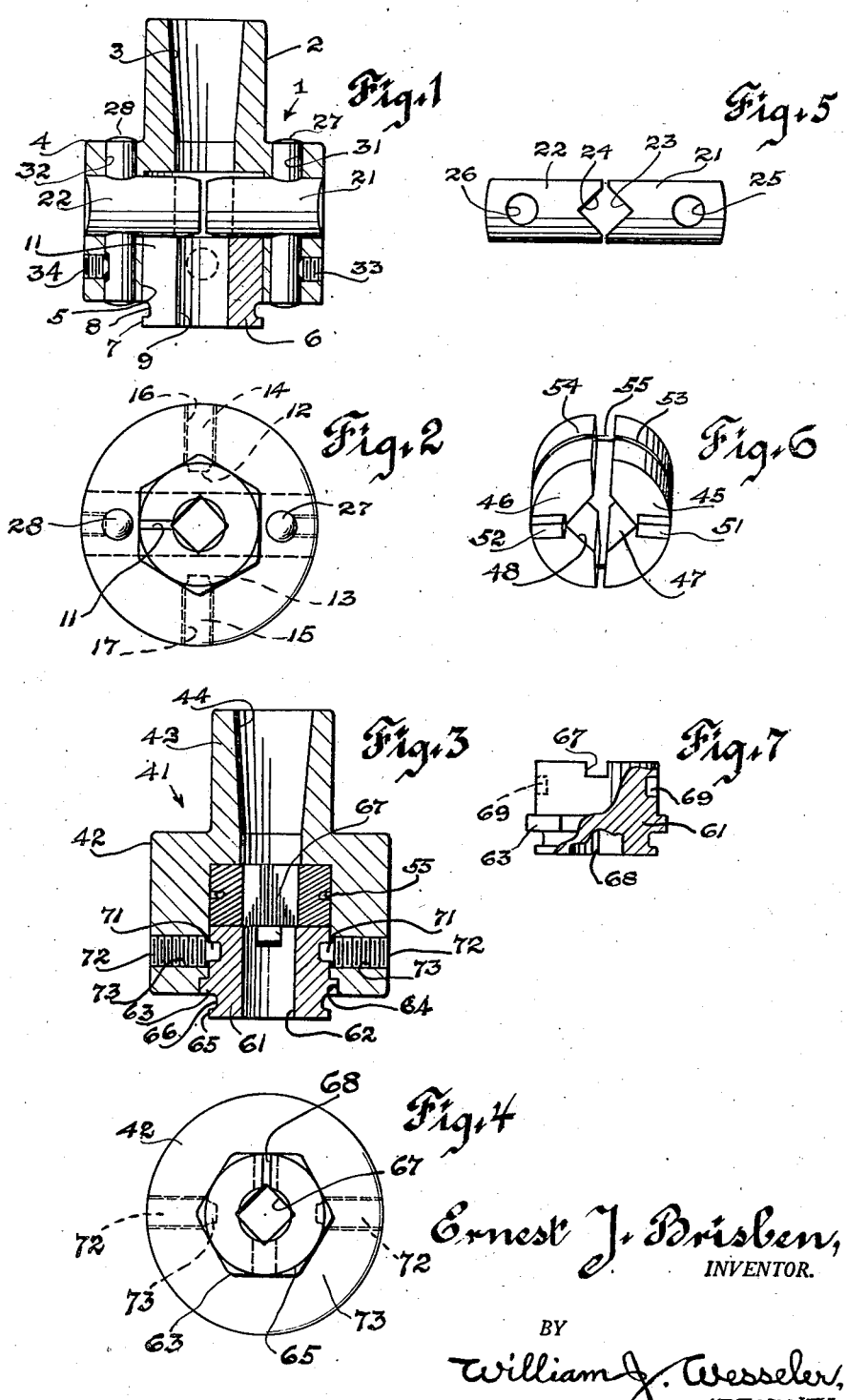
Ernest J. Brisben,
INVENTOR.
BY
William J. Wesseler,
ATTORNEY.

Patented Aug. 19, 1947

2,425,988

UNITED STATES PATENT OFFICE 2,425,988

CHUCK TOOLHOLDER

Ernest J. Brisben, East Cleveland, Ohio

Application February 14, 1945, Serial No. 577,787

2 Claims. (Cl. 279—103)

This invention, as indicated, relates to a chuck tool holder. More particularly it comprises a device adapted to receive the shank of a cutting or forming tool used in either vertical, or inclined horizontal position on a machine tool, such as a lathe, a milling machine, drill press, boring mill, or the like. It is especially adapted for use in a turret lathe wherein parts are automatically operated on through a series of tools for high speed production.

Heretofore the precision centering of cutting or forming tools having a shank has been somewhat a matter of adjustment and a mere approximation of alignment with the true centering. With the holder herein provided any cutting tool of precision manufacture, of the type provided with a shank, may be inserted in the holder for instantaneous operation, and no adjustment whatsoever is required as the tool will be perfectly centered through the centering guide or pilot bushing immediately in advance of the driving jaws. The holder is also adapted for use in conjunction with floating tool holders of release or non-release action. The holder may be made in several different ways so as to use either positioned jaws as the driving means, or to use a pair of jaw halves. The centering or pilot bushing is preferably a slotted bushing having resilient adjustment to different degrees of frictional engagement with the shank of the cutting tool. Through the use of set screws on opposite sides of the slotted bushing which is provided with recesses into which the free ends of said set screws engage, secure clamping of the cutting tool may be had and perfect axial alignment secured as well as a firm retention of said cutting tool through the frictional engagement of the bushing.

The principal object of the present invention is to provide an improved chuck tool holder.

Another object of the invention is to provide a chuck tool holder adapted to receive the shank of a cutting or forming tool and to center such tool at a point in advance of the driving jaws.

Another object of the invention is to provide a chuck tool holder adapted for use in conjunction with floating tool holders of release or non-release action.

Another object of the invention is to provide a chuck tool holder body within which shanks of variable size may be held in precision centering units insertable within such body, and wherein accurately adjusted driving jaws adapted for such special tool may be provided.

Another object of the invention is to provide improved units for use as centering guides and driving jaws in a chuck tool holder, whereby ready adjustment and replacement may be made in a minimum of time.

Other and further objects of the invention will appear in the course of the following description.

To the accomplishment of the foregoing and related ends, said invention, then, consists of the means hereinafter fully described and particularly pointed out in the claims; the annexed drawing and the following description setting forth in detail certain structures embodying the invention, such disclosed means constituting, however, but several of various forms in which the principle of the invention may be used.

In said annexed drawing:

Figure 1 is a central vertical sectional view showing a chuck tool holder embodying the principles of the invention;

Fig. 2 is a bottom plan view of the structure shown in Figure 1;

Fig. 3 is a central vertical sectional view of a modified form of tool from that disclosed in Figure 1;

Fig. 4 is a bottom plan view of the structure shown in Fig. 3;

Fig. 5 is a top plan view showing a pair of driving jaws of the type shown in Figs. 1 and 2;

Fig. 6 is a perspective view of the driving jaws used in the device shown in Fig. 3; and Fig. 7 is a side elevation, partly in section, of the centering guide or pilot bushing embodied in the device shown in Fig. 3.

As is clearly shown in Figures 1 and 2, the chuck tool holder comprises a body portion 1 having a shank portion 2 with a tapered socket 3 adapted to engage the Morse taper on the spindle of the machine tool. Immediately below the shank 2 the body is provided with an enlarged portion 4 having a recess 5 within which a slotted centering guide or pilot bushing 6 is engaged. The centering guide 6 is of cylindrical outline over the major portion of its extent and at its base has an extension 7, preferably of hexagonal shape, with an annular recess 8 provided intermediate said extension and the body portion of said guide member. The guide member 6 has a central opening 9 and a slot 11 is formed through the body to permit a slight degree of compression on the guide member.

The centering or pilot bushing 6 is provided with small recesses 12, 13, positioned on the diameter transversely related to the diameter in the plane of the slot 11, and these recesses receive the free ends of set screws 14, 15, screw-threadedly engaged in aligned recesses 16, 17, in the enlarged body section 4, whereby the bushing 6 may be firmly held and also may be adjusted to its proper degree of frictional engagement with the shank of the operative tool.

The recess 8 formed on the bushing 6 assists in its removal and replacement, and likewise, the hexagonal extension 7 may be used to turn and withdraw the bushing from the recess in the body.

Immediately behind the centering bushing 6, the driving jaws 21, 22, are positioned, said jaws having diagonal notches 23, 24, formed in the ends of the cylindrical members, and having openings 25, 26, to receive locking elements 27, 28, extending therethrough and also extending through adjacent aligned recesses 31, 32, in the enlargements of the body.

Set screws 33, 34, held in suitable threaded sockets engage the respective locking pins to hold them firmly in position. Both the driving jaws 21, 22, and the centering member 6 are thus held firmly in position, and permanent precision adjustment may be maintained for the body of the centering member and each and any of a series of tools necessary for the work for which the original set up is made.

The saving in the cost of skilled labor for the setting up operation is a matter of much importance and with the device herein provided exact identity of the centering may be maintained even though different sizes and character of tools are substituted, since all the parts used in the chuck tool holder are made to high precision requirements.

It will be noted that the chuck tool holder is illustrated as fitting a Morse taper terminal on the machine tool spindle, but it will be understood that any type of chuck, socket or spindle terminal element may be used with the device, as special conditions may require.

In the modified form of construction shown in Figures 3 and 4 the body member 41 is provided with an enlarged central portion 42 and a shank portion 43, the shank portion shown with a socket 44 adapted to fit a Morse taper. The construction is similar to that shown in Figure 1 and, as stated in connection with said figure, any other desired form of means for securing the body to the machine tool spindle may be used. In place of having a pair of cylindrical driving jaws as in the preferred form of the device shown in Figures 1 and 2, the driving function is served by a pair of semi-cylindrical members 45, 46, provided with notches 47, 48, of any desired form, but preferably set in diagonally to engage the squared end at the top of the tool to be inserted therein. The underfaces of the semi-cylindrical members are each provided with lugs 51, 52, which engage in driving recesses in the guide member presently to be described. The semi-cylindrical members are provided with central circumferential grooves 53, 54, in alignment with each other, within which a suitable wire spring 55, or similar resilient holding device, may be engaged to normally hold the semi-cylindrical members in contact with each other. The centering guide or pilot bushing 61 is shown more particularly in Figure 7 of the drawing and is formed as a cylindrical member with a central tool-receiving recess 62 and with a projecting extension 63, preferably of hexagonal outline, and adapted to set in a complementary countersunk recess 64 in the bottom face of the body member 41.

The lower portion 65 of the centering member projects below the extension 63 and an annular recess 66 is provided intermediate said parts to assist in removing the centering member from the recess in the event replacement or adjustment becomes necessary. The centering guide 61 is formed with notches 67 on its upper face, of a suitable size to receive the lugs 51, 52, on the semi-cylindrical members heretofore referred to, and is preferably formed with a slot 68 extending through the body portion at one side. Small recesses 69 are provided in the sides of the centering member, preferably upon a diameter transversely to the diameter of the notches 67, and the reduced ends 71 are adapted to engage the recesses 69, such reduced ends being formed on the ends of set screws 72 adjustably mounted in screw-threaded openings 73 adjacent the lower portion of the body member 41. The set screws 72 are the means for firmly maintaining the centering member and its associated semi-cylindrical driving elements securely in position.

It will be noted that the driving strains are not only assumed in part by the relatively heavy set screws 72, but are also taken by the close engagement of the hexagonal extension 63 within the countersunk recess 64. This firm engagement with the body is transferred to the semi-cylindrical members providing the driving jaws and thus an extremely strong construction is provided, adapted for heavy duty service.

Under certain conditions where bar stock or the like is to be handled, the driving jaws may be omitted and the chuck tool holder used as a frictionally operated clamp upon such bar stock. A suitably shaped central passageway for the bar stock may be provided in the event the bar stock has a special cross-sectional shape. The degree of clamping movement of the centering member is very slight, but no difficulty would be experienced in applying the necessary degree of clamping pressure through the use of suitable set screws.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. A device of the character described having in combination a body member adapted to be securely engaged upon the spindle of a machine tool, a recess within said body member adapted to receive a centering guide and tool clamping member and driving means for an operating tool, a pair of cylindrical jaw members having notched ends engaged through openings in said body member with the notched ends projecting into said recess, holding pins engaged through openings positioned transversely of said cylindrical jaw members, a centering member engaged in the recess of said body member immediately in advance of said driving jaws, and set screws extending transversely through openings in said body member and into recesses in said centering member to hold said centering member securely in position.

2. A device of the character described having in combination a body member adapted to be securely engaged upon the spindle of a machine tool, a recess within said body member adapted to receive a centering guide member and driving means for an operating tool, a pair of cylindrical jaw members having notched ends engaged through openings in said body member with the notched ends projecting into said recess, holding pins engaged through openings positioned transversely of said cylindrical jaw members, set screws engaged in said body member for locking said holding pin, a centering member engaged in the recess of said body member immediately beneath said driving jaws, and set screws extending transversely through openings in said body member to hold said centering member securely in position.

ERNEST J. BRISBEN.

REFERENCES CITED

The following references are of record in the file of this patent:

UNITED STATES PATENTS

| Number | Name | Date |
| --- | --- | --- |
| 318,986 | Hicks | June 2, 1885 |
| 1,775,992 | Emrick | Oct. 12, 1927 |
| 383,289 | Grabler | May 22, 1888 |
| 1,037,796 | Procunier | Sept. 3, 1912 |
| 469,025 | Frehn | Feb. 16, 1892 |
| 207,113 | Elterich et al. | Aug. 20, 1878 |
| 1,899,843 | Bascom | Feb. 28, 1933 |